US009294228B2

(12) United States Patent
Im et al.

(10) Patent No.: US 9,294,228 B2
(45) Date of Patent: Mar. 22, 2016

(54) DEVICE AND METHOD FOR DETERMINING HIGH SPEED SHARED CONTROL CHANNEL IN A COMMUNICATION TERMINAL

(75) Inventors: Ju Hyuk Im, Seoul (KR); Min Ho Shin, Suwon-si (KR); Kwang Man Ok, Hwaseong-si (KR); Gang Mi Gil, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1378 days.

(21) Appl. No.: 12/615,784

(22) Filed: Nov. 10, 2009

(65) Prior Publication Data
US 2010/0118707 A1 May 13, 2010

(30) Foreign Application Priority Data
Nov. 11, 2008 (KR) .................. 10-2008-0111702

(51) Int. Cl.
H04L 1/00 (2006.01)
H04L 1/18 (2006.01)
H04L 1/20 (2006.01)

(52) U.S. Cl.
CPC ............ H04L 1/0072 (2013.01); H04L 1/1896 (2013.01); H04L 1/20 (2013.01); *H04L 1/0039* (2013.01); *H04L 1/0054* (2013.01)

(58) Field of Classification Search
CPC ....... H04L 1/20; H04L 1/1896; H04L 1/0072; H04L 1/0039; H04L 1/0054; H03M 13/4146; H03M 13/1337

USPC .......................................... 370/241
See application file for complete search history.

(56) References Cited

U.S. PATENT DOCUMENTS

| 2003/0192003 A1* | 10/2003 | Das et al. ............ 714/758 |
| 2005/0078648 A1* | 4/2005 | Nilsson ............ 370/342 |
| 2008/0130556 A1* | 6/2008 | Chang et al. ............ 370/329 |
| 2008/0205349 A1 | 8/2008 | Kim et al. |

FOREIGN PATENT DOCUMENTS

KR 1020080078617 8/2008

* cited by examiner

Primary Examiner — Jason Mattis
Assistant Examiner — Stephen J Clawson
(74) Attorney, Agent, or Firm — The Farrell Law Firm, P.C.

(57) ABSTRACT

An apparatus and method for detecting high speed shared control channel of a communication terminal is provided, which recognizes decoding reliability for each of high-speed shared control channel by decoding each of a plurality of high-speed shared control channels; decides a maximum and a minimum in the decoding reliability, calculates a difference between the maximum and the minimum to compare the calculated difference with a preset critical value; and detects and processes a high-speed shared control channel corresponding to the maximum, when the difference exceeds the critical value. Accordingly, even though the wireless environment is inferior, the decoding reliability of an HS-SCCH can be more accurately decided in an HS-SCCH detection apparatus of the communications terminal and the detection performance of the HS-SCCH can be improved in a communication terminal.

6 Claims, 7 Drawing Sheets

DEVICE AND METHOD FOR DETERMINING HIGH SPEED SHARED CONTROL CHANNEL IN A COMMUNICATION TERMINAL

PRIORITY

This application claims priority to an application entitled "DEVICE AND METHOD FOR DETERMINING HIGH SPEED SHARED CONTROL CHANNEL IN COMMUNICATION TERMINAL" filed in the Korean Intellectual Property Office on Nov. 11, 2008 and assigned Serial No. 10-2008-0111702, the contents of which are hereby incorporated by reference.

BACKGROUND OF THE INVENTION

1. Field of the Invention

The present invention relates to a communication terminal and a communication method using the same, and more particularly, to an apparatus and method for detecting High Speed Shared Control Channel (HS-SCCH) of a communication terminal.

2. Description of the Related Art

Recent mobile communication system has been developed as a high-speed, high-quality packet data communication system for providing not only voice service, but also various multimedia services. To this end, the current 3rd Generation Partnership Project (3GPP) supports High Speed Downlink Packet Access (HSDPA) technology. The HSDPA provides a high-speed downlink packet data service which is available at a frequency band which same as that of the existing Wideband Code Division Multiple Access (WCDMA) Release 99 and Release 4. Such a HSDPA applies Adaptive Modulation and Coding (AMC) and Hybrid Automatic Repeat reQuest (HARQ) techniques for the increase of transmission efficiency, and adds a scheduler function to the base station (Node B) to make fast channel adaptation possible.

The channel structure of the HSDPA includes High Speed Downlink Shared CHannel (HS-DSCH), High Speed Physical Downlink Shared CHannel (HS-PDSCH), High Speed Shared Control CHannel (HS-SCCH) and High Speed Dedicated Physical Control Channel (HS-DPCCH). An HS-SCCH is a shared control channel for transmitting control information for demodulation of a HS-PDSCH. That is, a communication terminal recognizes whether the HS-PDSCH will be demodulated, depending on reliability of the result of demodulation of the HS-SCCH. Also, in a communication terminal, reliability of the demodulation result is a decoding reliability of a Viterbi decoder, and is recognized, for example, by a path metric value. In other words, a communication terminal compares the decoding reliability with a given critical value so as to recognize whether to demodulate the HS-PDSCH.

SUMMARY OF THE INVENTION

In a communication terminal of the above-mentioned communication system, decoding reliability may change depending on wireless environment or the like. Hence, as the communication terminal compares decoding reliability with a given critical value, there may be an error in determining reliability of the result of demodulation of the HS-SCCH. For example, in the case where the wireless environment is not good (i.e., of poor quality), the decoding reliability may be less than the critical value. That is, depending on the wireless environment, the possibility of demodulating the HS-PDSCH in the communication terminal may change. Accordingly, the performance of the communication terminal may be deteriorated.

In accordance with an aspect of the present invention, a method of detecting a high-speed shared control channel which transmits control information for demodulating a specific high-speed physical downlink shared channel in a communication terminal includes recognizing decoding reliability for each of high-speed shared control channel by decoding each of a plurality of high-speed shared control channels; deciding a maximum and a minimum in the decoding reliability; calculating a difference between the maximum and the minimum to compare the calculated difference with a preset critical value; and detecting and processing a high-speed shared control channel corresponding to the maximum, when the difference exceeds the critical value.

In accordance with another aspect of the present invention, an apparatus for detecting a high-speed shared control channel which transmits control information for demodulating a specific high-speed physical downlink shared channel in a communication terminal includes a reliability recognition unit which is configured to decode each of a plurality of high-speed shared control channels, and to recognize decoding reliability for each of the high-speed shared control channels; a reliability comparison unit which is configured to recognize a maximum and a minimum in the decoding reliability, to calculate a difference between the maximum and the minimum to compare the calculated difference with a preset critical value; and a detection control unit which is configured to detect and process a high-speed shared control channel corresponding to the maximum when the difference exceeds the critical value.

Therefore, an apparatus and method for detecting High Speed Shared Control Channel of a communication terminal according to the present invention as described above reduce a maximum value of the decoding reliability to a minimum value, and compares this value with a critical value, after excluding an affect caused by a wireless environment. Accordingly, even though the wireless environment is inferior, the decoding reliability of the HS-SCCH can be more accurately decided in a HS-SCCH detection apparatus of the communication terminal, and the detection performance of the HS-SCCH can be improved in a communication terminal.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the present invention, the channel structure of a High Speed Downlink Packet Access (HSDPA) includes a High Speed Downlink Shared CHannel (HS-DSCH) of down link, a High Speed Physical Downlink Shared Channel (HS-PDSCH), a High Speed Shared Control Channel (HS-SCCH) and a High Speed Dedicated Physical Control Channel (HS-DPCCH). An HS-DSCH is a down link transmission channel for the high speed packet data transmission, and an HS-PDSCH is a downlink physical channel for transmitting channel data of the HS-DSCH. An HS-SCCH is a downlink channel for transmitting control information necessary to receive packet data and control information for other use in a communications terminal.

The HS-SCCH is a shared channel for transmitting a control information for the demodulation of the HS-PDSCH. The HS-DPCCH is an uplink channel which is used to feed back modulation and encoding information which is suitable for a corresponding channel status by selecting a base station in which the downstream pilot channel situation is most excellent, in the communication terminal. The HS-DPCCH is a dedicated channel for transmitting the ACK/NACK signal for the reception of packet data. That is, after the HS-SCCH is demodulated, the demodulation of the HS-PDSCH is performed and the communication of high speed packet data is performed, in the communication terminal. In the communication system applying the HSDPA, the temporal relationship of the HS-SCCH and the HS-PDSCH is illustrated.

Figure 1:
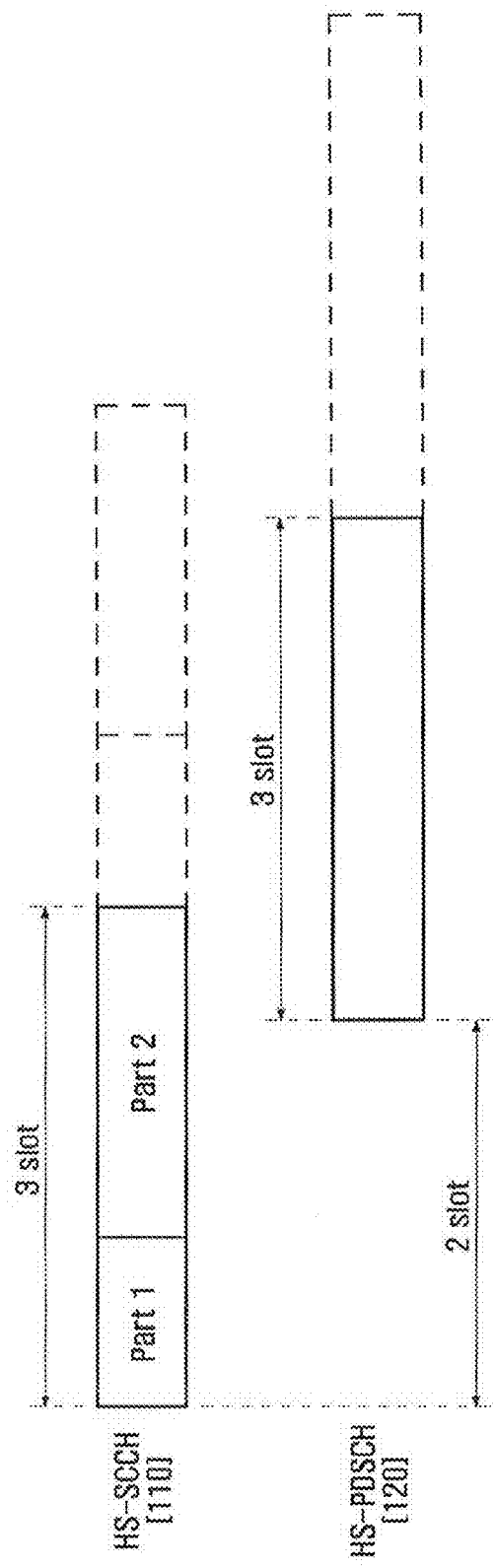
FIG. 1 is a diagram illustrating the relation of a High Speed Shared Control Channel and a High Speed Physical Downlink Shared Channel, in a communications system applying HSDPA.

FIG. 1 is a structure diagram illustrating the relation of a High Speed Shared Control Channel (HS-SCCH) and a High Speed Physical Downlink Shared Channel (HS-PDSCH), in a communications system applying HSDPA.

Referring to FIG. 1, the HS-SCCH 110 and the HS-PDSCH 120 have a time interval of 2 slots. That is, in the communication terminal, after the HS-SCCH 110 is demodulated, the HS-PDSCH 120 which is received after the HS-SCCH 110 by 2 slots can be demodulated by using the control information of the HS-SCCH 110. At this time, the HS-SCCH 110 is a downlink control channel which uses Quadrature Phase Shift Keying (QPSK), Spreading Factor (SF)=128 added for the HSDPA, carries a control information for the demodulation of the HS-PDSCH 120. And in the base station, the control information can be transmitted through a maximum of four HS-SCCHs 110. The structure of the HS-SCCH is illustrated as follows.

Figure 2:
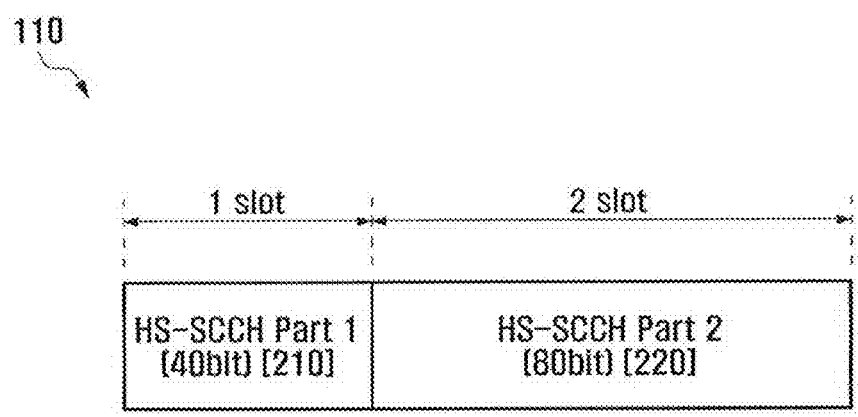
FIG. 2 is a diagram illustrating a structure of High Speed Shared Control Channel.

FIG. 2 is a structure diagram illustrating a structure of a High Speed Shared Control Channel (HS-SCCH).

Referring to FIG. 2, the HS-SCCH 110 includes a first part of 1 slot (Part 1) 210 and a second part of 2 slots (Part 2) 220. In the first part 210, the control information includes a Modulation Scheme (MS) and Channelization Code Set (CCS). In the second part 220, the control information includes Hybrid Automatic Repeat reQuest (HARQ) information, for example, the transport block size, the HARQ process information (HAP), the Redundancy and constellation Version (RV), and the New data Indicator (NI). At this time, the base station of the communications system masks the control information of the first part 210 with a User Equipment IDentifier (UE ID) of a specific communication terminal and transmits the masked control information. If a corresponding UE ID is checked in the first part 210 of the HS-SCCH 110, the communication terminal prepares the demodulation of the HS-PDSCH 120. Otherwise, the communication terminal prepares the next demodulation of the HS-SCCH 110. The apparatus for transmitting the HS-SCCH 110 is illustrated in below.

Figure 3:
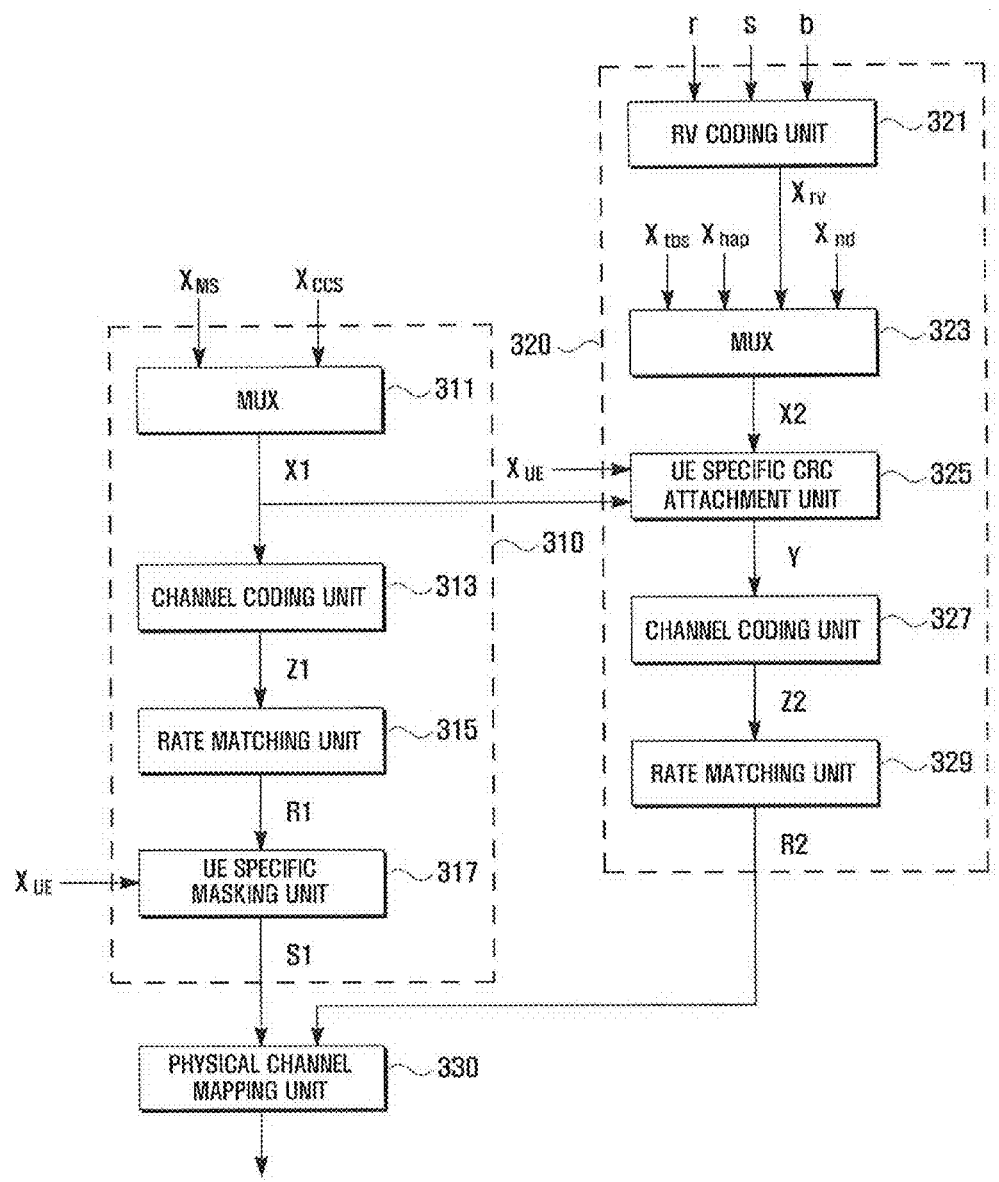
FIG. 3 is a block diagram illustrating a high speed shared control channel transmission device in a base station.

FIG. 3 is a block diagram illustrating an HS-SCCH 110 transmission device in a base station.

Referring to FIG. 3, the HS-SCCH 110 transmission device includes a first part generation unit 310, a second part generation unit 320, and a physical channel mapping unit 330. The first part generation unit 310 includes a Multiplexer (MUX) 311, a channel coding unit 313, a rate matching unit 315 and a UE specific masking unit 317. The MUX 311 multiplexes the Modulation Scheme, that is, the $X_{MS}$ sequence, with the CCS, that is, the $X_{CCS}$ sequence, for a specific communication terminal to generate an X1 stream of 8 bits. The channel coding 313 generates a Z1 stream of 48 bits by Viterbi coding the X1 stream. The rate matching unit 315 generates an R1 stream of 40 bits. The UE specific masking unit 317 generates an S1 stream of 40 bits by the eXclusive OR (XOR) of the R1 stream and the UE ID stream of 40 bits, that is, the Xue stream.

The second part generation unit 320 includes a Random Variable (RV) coding unit 321, a MUX 323, a UE specific Cyclic Redundancy Check (CRC) attachment unit 325, a channel coding unit 327 and a rate matching unit 329. The RV coding unit 321 generates redundancy version information, that is, the Xrv stream, through the Lander variable coding of r and s which are a redundancy version variable and b which is a constellation version variable. The MUX 323 generates an X2 stream by multiplexing the transport block size information, that is, the $X_{tbs}$ stream, the HARQ process information, that is, the $X_{hap}$ stream, and the new data indicator, that is, the $X_{nd}$ stream, as well as the Xrv stream. The UE specific CRC attachment unit 325 generates a Y stream by attaching the CRC indicating the $X_{UE}$ stream to the X1 stream and X2 stream. The channel coding unit 327 generates a Z2 stream by coding the Y stream. The rate matching unit 329 generates an R2 stream by rate matching the Z2 stream. The physical channel mapping unit 330 maps the S1 stream to the first part 210 of the HS-SCCH 110, and transmits the result. The physical channel mapping unit 330 maps the R2 stream to the second part 220 of the HS-SCCH 110 and transmits the result. An apparatus for detecting the HS-SCCH 110 is illustrated below.

Figure 4:
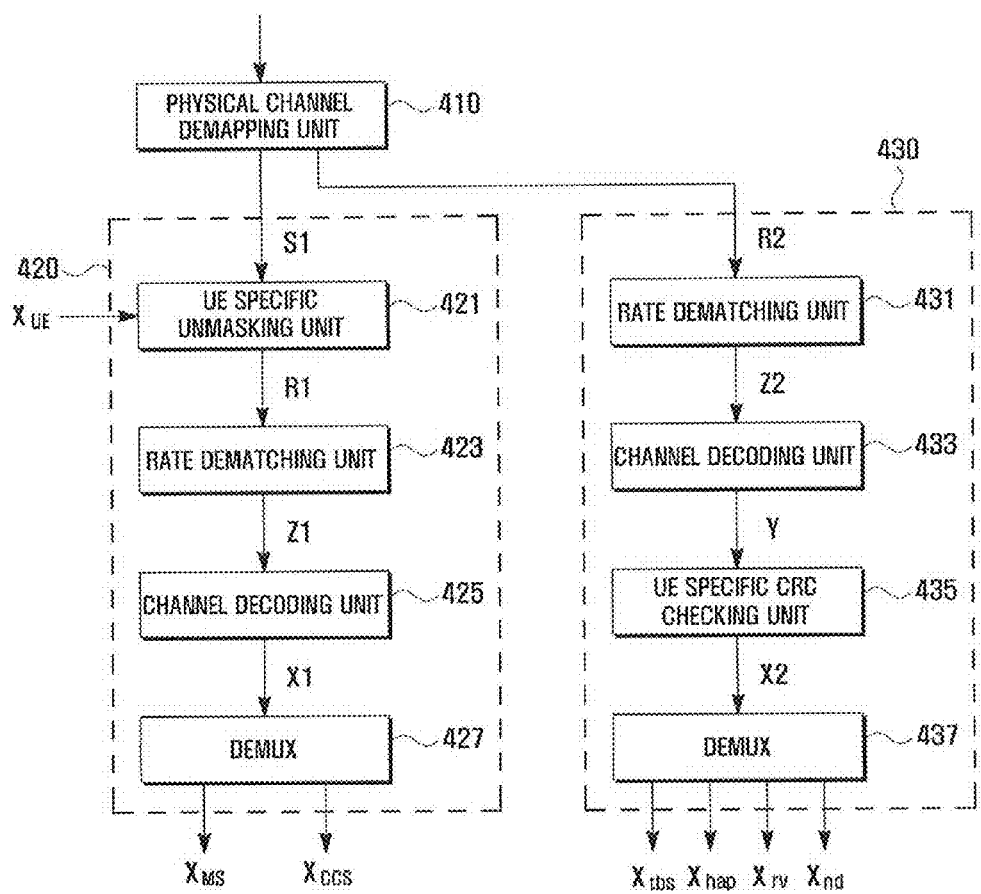
FIG. 4 is a block diagram illustrating a high speed shared control channel detection device in a communications terminal according to an embodiment of the present invention.

FIG. 4 is a block diagram illustrating an HS-SCCH 110 detection device in a communications terminal according to an embodiment of the present invention.

Referring to FIG. 4, the HS-SCCH 110 detection device includes a physical channel demapping unit 410, a first part checking unit 420, and a second part checking unit 430. The physical channel demapping unit 410 obtains the S1 stream of 40 bits from the first part 210 of the HS-SCCH 110. The physical channel demapping unit 410 obtains the S2 stream from the second part 220 of the HS-SCCH 110. The first part checking unit 420 includes a UE specific unmasking unit 421, a rate dematching unit 423, a channel decoding unit 425 and a demultiplexer (DEMUX) 427. The UE specific unmasking unit 421 generates an R1 stream of 40 bits by the exclusive OR of the $X_{UE}$ stream of 40 bits and the S1 stream. The rate dematching unit 423 generates a Z1 stream of 48 bits by rate-dematching the R1 stream. The channel decoding unit 425 generates a X1 stream of 8 bits by Viterbi decoding the Z1 stream. The DEMUX 427 demultiplexes the X1 stream and outputs the $X_{MS}$ sequence and $X_{CCS}$ sequence. In the base station, with respect to a signal received at a plurality of HS-SCCHs 110, for example, four HS-SCCHs 110, the channel decoding unit 425 generates an X1 stream for each HS-SCCH 110. The channel decoding unit 425 recognizes that a corresponding UE ID is checked at each HS-SCCH 110. That is, the channel decoding unit 425 recognizes whether the second part 220 of the HS-SCCH 110 and the HS-PDSCH 120 are demodulated. At this time, if a corresponding UE ID is checked in the first part 210 of the HS-SCCH 110, the channel decoding unit 425 controls to demodulate the second part 220 of the HS-SCCH 110 and the HS-PDSCH 120.

The second part checking unit 430 includes a rate dematching unit 431, a channel decoding unit 433, a UE specific CRC checking unit 435 and a demultiplexer 437. The rate dematching unit 431 generates a Z2 stream by rate-dematching the R2 stream. The channel decoding 433 generates a Y stream by decoding the Z2 stream. The UE specific CRC checking unit 435 checks the CRC of Y stream. If the CRC is valid, the UE specific CRC checking unit 435 generates the X2 stream. The demultiplexer 437 outputs an $X_{rv}$ stream, an $X_{tbs}$ stream, an $X_{hap}$ stream and an $X_{nd}$ stream by demultiplexing the $X_2$ stream. A detailed configuration of the channel decoding unit 425 in this first part checking unit 420 is illustrated.

Figure 5:
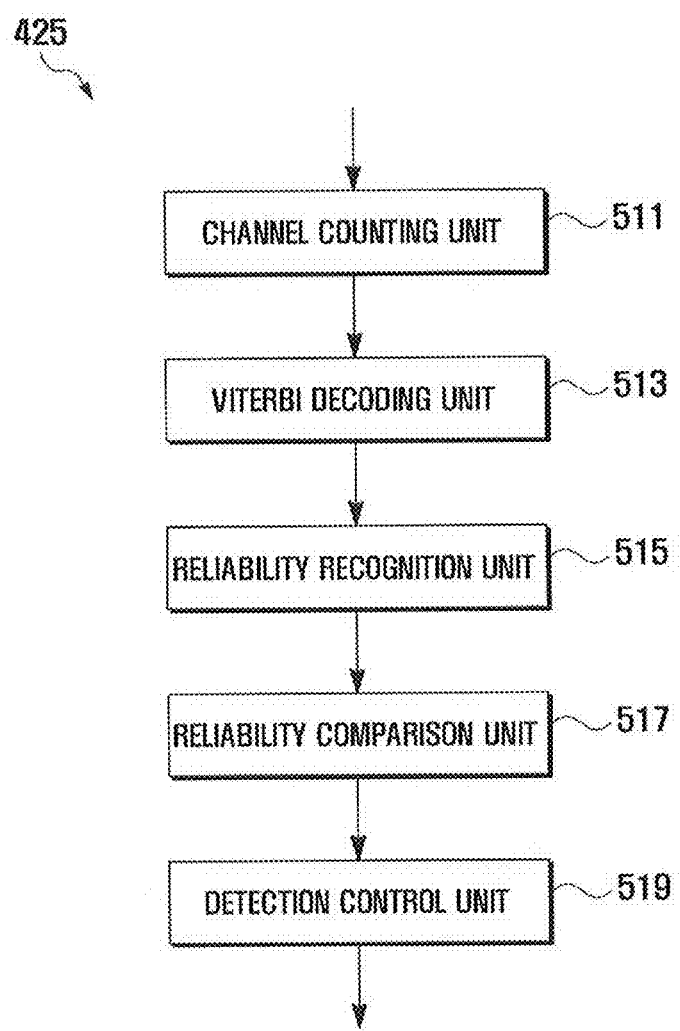
FIG. 5 is a block diagram illustrating a channel decoding unit of FIG. 4.

FIG. 5 is a block diagram illustrating a channel decoding unit 425 of FIG. 4.

Referring to FIG. 5, the channel decoding unit 425 of the first part checking unit 420 includes a channel counting unit 511, a Viterbi decoding unit 513, a reliability recognition unit 515, a reliability comparison unit 517 and a detection control unit 519. The channel counting unit 511 counts the HS-SCCH 110 in the reception of a signal through the HS-SCCH 110. At this time, the channel counting unit 511 performs successive numbering of the HS-SCCH 110. That is, in the case where the HS-SCCH 110 includes four channels, the channel counting unit 511 successively numbers the HS-SCCH 110 with a first channel, a second channel, a third channel and a fourth channel. And in the base station, control information can be transmitted through a maximum of four HS-SCCHs 110. The Viterbi decoding unit 513 performs the Viterbi decoding according to each HS-SCCH 110. Such a Viterbi decoding unit 513 decodes a signal which is coded with a convolutional code into a Viterbi algorithm adopting the maximum likelihood technique. The reliability recognition unit 515 recognizes the decoding reliability for each HS-SCCH 110. At this time, the reliability recognition unit 515 decides the decoding reliability by using a path metric value, and the reliability recognition unit 515 normalizes a decoding reliability and decides the decoding reliability. That is, the reliability recognition unit 515 accumulates a signal received through each HS-SCCH 110 and calculates the accumulated value. Moreover, the reliability recognition unit 515 divides the decoding reliability of a corresponding HS-SCCH 110 by the accumulated value, thereby normalizing the decoding reliability.

Here, the path metric value can be one among Viterbi Path Metric Difference (VPMD), Minimum Path Metric Difference (MPMD), Average Path Metric Difference (APMD), and reencoded Symbol Error Rate (SER). The VPMD indicates a path metric difference between a survival path and a non-survival path of the final stage of decoding in the Viterbi decoding unit 513. The MPMD indicates a minimum value of the path metric difference throughout all stages of the final survival path in the Viterbi decoding unit 513. The APMD indicates a mean value of the path metric difference throughout all stages of the final survival path in the Viterbi decoding unit 513. The SER indicates a bit difference which is generated by encoding again the decoded signal.

The reliability comparison unit 517 compares the decoding reliability of the HS-SCCH 110, and decides the maximum value and the minimum value of the decoding reliability. The reliability comparison unit 517 compares a difference between the maximum value and the minimum value of the decoding reliability with a preset critical value. That is, the reliability comparison unit 517 recognizes whether the difference exceeds the critical value. According to the comparison result of the reliability comparison unit 517, the detection control unit 519 checks whether the HS-SCCH 110 for a corresponding communication terminal is allocated. If it is determined that the difference exceeds the critical value, the detection control unit 519 decides that the HS-SCCH 110 for a corresponding communication terminal is allocated. Here, the detection control unit 519 detects the HS-SCCH 110 corresponding to the maximum value. The detection control unit 519 demodulates the second part of a corresponding HS-SCCH 110 and the HS-PDSCH 120 having 2 slot interval with a corresponding HS-SCCH 110. According to the control information of the HS-SCCH 110, the detection control unit 519 demodulates the HS-PDSCH 120. The HS-SCCH 110 detection method in the communications terminal having such a configuration is explained below.

Figure 6:
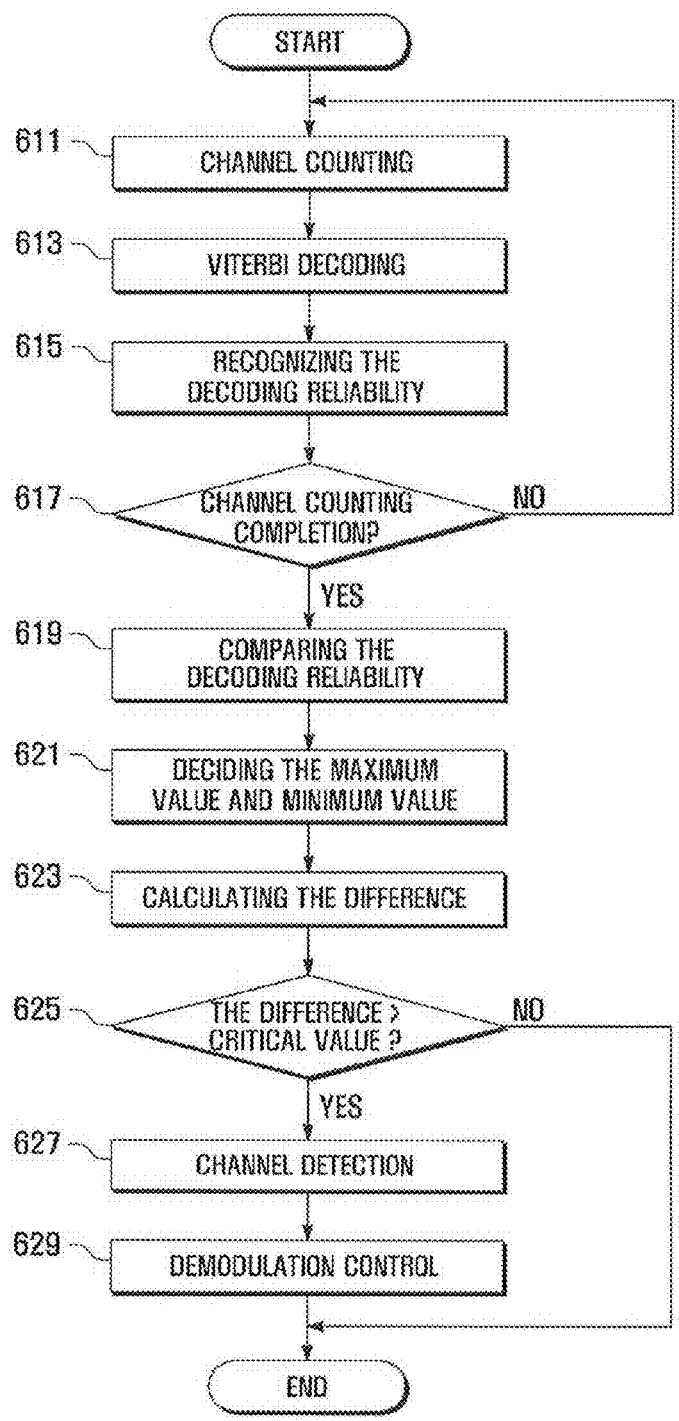
FIG. 6 is a flowchart illustrating a high speed shared control channel detection procedure in a communications terminal according to an embodiment of the present invention.

FIG. 6 is a flowchart illustrating a HS-SCCH 110 detection procedure in a first part checking unit 420 of a communications terminal according to an embodiment of the present invention.

Referring to FIG. 6, the channel decoding unit 425 counts the HS-SCCH 110 in the first part checking unit 420 at step 611. In the case where the HS-SCCH 110 is made of four channels, the channel decoding unit 425 successively numbers the HS-SCCH 110 with the first channel, the second channel, the third channel and the fourth channel. The channel decoding unit 425 performs the Viterbi decoding of a corresponding HS-SCCH 110 at step 613. Moreover, the channel decoding unit 425 recognizes the decoding reliability of a corresponding HS-SCCH 110 at step 615. At this time, the channel decoding unit 425 normalizes the decoding reliability and decides, that is, the channel decoding unit 425 accumulates a signal received through each HS-SCCH 110 and calculates the accumulated value. Moreover, the channel decoding unit 425 divides the decoding reliability of a corresponding HS-SCCH 110 by the accumulated value, so that the decoding reliability is normalized. Then, the channel decoding unit 425 recognizes whether the channel counting is completed at step 617. That is, the channel decoding unit 425 recognizes whether the counting of the first channel to the fourth channel is completed with respect to the HS-SCCH 110. If it is recognized that the channel counting is not completed, the channel decoding unit 425 repeatedly performs step 611 to step 617 until the channel counting is completed. If the channel counting is completed, the channel decoding unit 425 compares the decoding reliability for each HS-SCCH 110 at step 619. At this time, the channel decoding unit 425 classifies the extent of the decoding reliability for each HS-SCCH 11, in terms of a large reliability or small reliability. In addition, the channel decoding unit 425 decides the maximum value and minimum value of the decoding reliability at step 621. Moreover, the channel decoding unit 425 calculates the difference between the maximum value and the minimum value at step 623. Finally, the channel decoding unit 425 recognizes whether the difference exceeds a preset critical value at step 625. At this time, if it is recognized that the difference exceeds the critical value at step 625, the channel decoding unit 425 detects the HS-SCCH 110 corresponding to the maximum value at step 627. The channel decoding unit 425 controls to perform the demodulation of the second part 220 of corresponding HS-SCCH 110 and the HS-PDSCH 120 at step 629.

At this time, if the HS-SCCH is allocated to a specific communication terminal, the decoding reliability of a corresponding HS-SCCH in a corresponding communication terminal is remarkably high in comparison with the decoding reliability of other HS-SCCHs. Otherwise, the decoding reliability of all HS-SCCHs is similar. At this time, the affect caused by the wireless environment is identical with respect to all HS-SCCHs. According to the present invention, the HS-SCCH detection device of the communication terminal reduces the maximum value of the decoding reliability to the minimum value to exclude the affect caused by the wireless environment, then compares this with a critical value. Accordingly, even though the wireless environment is inferior, the decoding reliability of HS-SCCH can be more accurately decided in the HS-SCCH detection device of the communications terminal. And, in the communications terminal, the detection performance of HS-SCCH can be improved. The comparison of the HS-SCCH detection performance according to the present invention with the existing HS-SCCH detection performance is illustrated below.

Figure 7A:
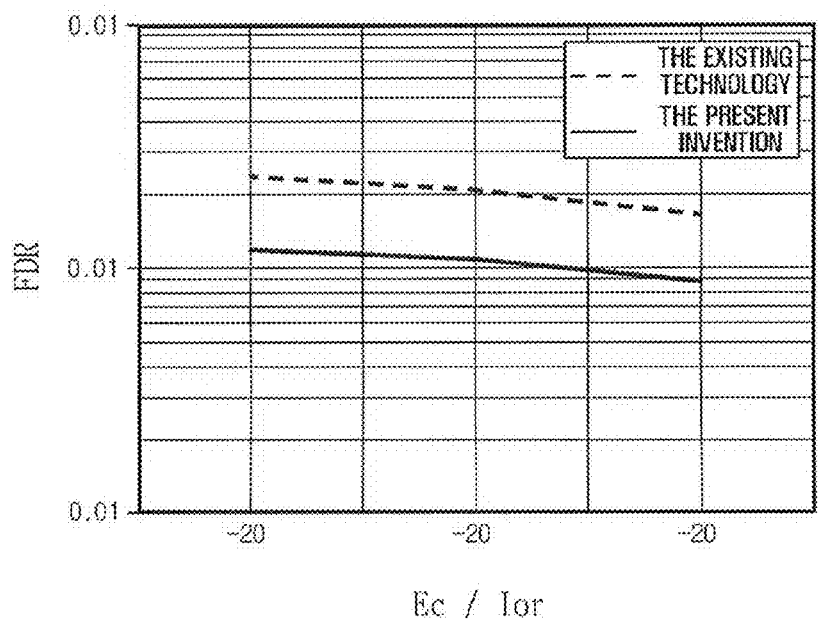
FIGS. 7A and 7B are graphs illustrating a high speed shared control channel detection performance in a communications terminal according to an embodiment of the present invention.
Figure 7B:
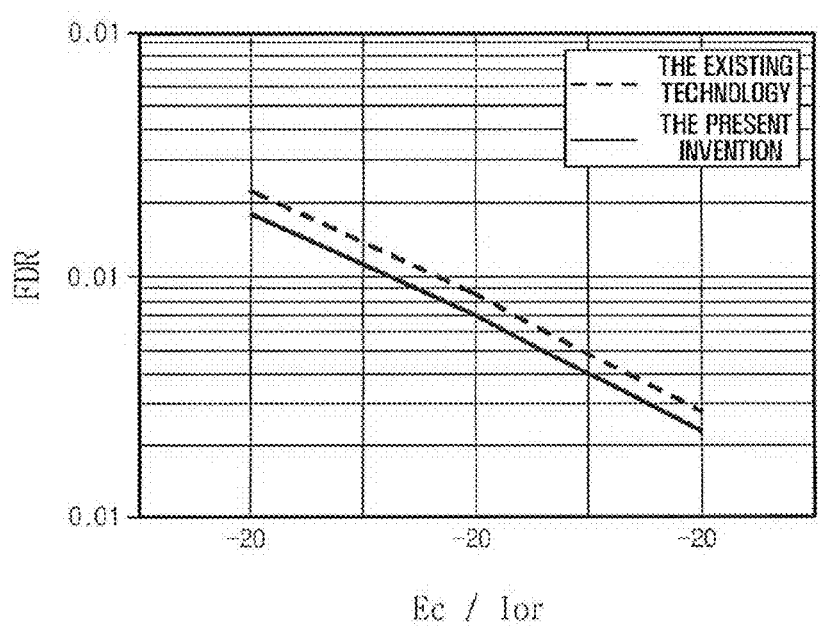

FIGS. 7A and 7B are graphs illustrating a high speed shared control channel detection performance in a communications terminal according to an embodiment of the present invention.

FIG. 7A illustrates a case in which the HS-SCCH is not allocated to a specific communication terminal, and FIG. 7B illustrates a case in which the HS-SCCH is allocated to a specific communication terminal. That is, as shown in FIGS. 7A and 7B, in a specific value of the average transmission energy (Ec/Ior) per a pseudo-noise chip, in the determination of Frame Disambiguation Rate (FDR), the HS-SCCH detection of the present invention has an apparent advantage in comparison with the existing HS-SCCH detection.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of detecting a high-speed shared control channel which transmits control information for demodulating a specific high-speed physical downlink shared channel in a communication terminal, the method comprising:

recognizing decoding reliability for each high-speed shared control channel by decoding each of a plurality of high-speed shared control channels;

deciding a maximum decoding reliability and a minimum decoding reliability from the recognized decoding reliabilities;

calculating a difference between the maximum decoding reliability and the minimum decoding reliability;

comparing the calculated difference with a preset critical value; and detecting and processing a high-speed shared control channel corresponding to the maximum decoding reliability, when the difference exceeds the critical value.

2. The method of claim 1, wherein detecting and processing a high-speed shared control channel comprises demodulating a corresponding high-speed physical downlink shared channel using control information of the detected high-speed shared control channel.

3. The method of claim 1, wherein recognizing the decoding reliability comprises:

Viterbi-decoding each of the high-speed control channels; and normalizing decoding reliability of each of the high-speed shared control channels.

4. An apparatus for detecting a high-speed shared control channel which transmits control information for demodulating a specific high-speed physical downlink shared channel in a communication terminal, the apparatus comprising:

a reliability recognition unit which is configured to decode each of a plurality of high-speed shared control channels, and to recognize decoding reliability for each of the high-speed shared control channels;

a reliability comparison unit which is configured to decide a maximum decoding reliability and a minimum decoding reliability from the recognized decoding reliabilities, to calculate a difference between the maximum decoding reliability and the minimum decoding reliability, and to compare the calculated difference with a preset critical value; and a detection control unit which is configured to detect and process a high-speed shared control channel corresponding to the maximum decoding reliability when the difference exceeds the critical value.

5. The apparatus of claim 4, wherein the detection control unit demodulates a corresponding high-speed physical downlink shared channel using control information of the detected high-speed shared control channel.

6. The apparatus of claim 4, wherein the reliability recognition unit recognizes and normalizes the decoding reliability when Viterbi-decoding each high-speed shared control channel.

* * * * *